US010119422B2

(12) United States Patent
Mariano et al.

(10) Patent No.: US 10,119,422 B2
(45) Date of Patent: Nov. 6, 2018

(54) COUPLING SYSTEM COMPRISING SELF LOCKING JOINT

(71) Applicant: United Technologies Corporation, Hartford, CT (US)

(72) Inventors: Thomas A. Mariano, Middlebury, CT (US); Jason Arnold, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 272 days.

(21) Appl. No.: 14/945,973

(22) Filed: Nov. 19, 2015

(65) Prior Publication Data

US 2017/0145859 A1 May 25, 2017

(51) Int. Cl.
*F01D 25/24* (2006.01)
*F01D 5/02* (2006.01)
*F01D 5/06* (2006.01)

(52) U.S. Cl.
CPC ........... *F01D 25/246* (2013.01); *F01D 5/022* (2013.01); *F01D 5/026* (2013.01); *F01D 5/06* (2013.01); *F01D 5/066* (2013.01); *F05D 2230/60* (2013.01); *F05D 2260/36* (2013.01); *Y02T 50/671* (2013.01)

(58) Field of Classification Search
CPC . F01D 25/246; F05D 2260/36; F05D 2230/60
See application file for complete search history.

(56) References Cited

U.S. PATENT DOCUMENTS

| 4,362,520 A * | 12/1982 | Perry | ........................ F16D 3/18 464/149 |
| 2011/0158744 A1* | 6/2011 | Dornfeld | ................. F16D 1/076 403/364 |

* cited by examiner

*Primary Examiner* — Moshe Wilensky

(74) *Attorney, Agent, or Firm* — Snell & Wilmer L.L.P.

(57) ABSTRACT

Disclosed is a coupling system comprising joints configured to friction lock under compressive pressure via tapered teeth for joining rotating components, which may be rotating components of a gas turbine, or other engine. The coupling system provides the alignment orientation for the joined components, and eliminates the need for extraneous fasteners, bolts, interference fits and/or keying arrangements. The coupling system further enables material optimization by allowing for use of different materials throughout different engine sections, depending on the operating parameters.

10 Claims, 5 Drawing Sheets

COUPLING SYSTEM COMPRISING SELF LOCKING JOINT

BACKGROUND

A gas turbine engine may typically include one or more stacks of rotating elements, such rotor stacks, associated with one or more sections of the engine. A rotor stack may include several longitudinally spaced apart blade-carrying disks of successive stages of the section. A stator structure may include circumferential stages of vanes longitudinally interspersed with the rotor disks. The rotor disks are secured to each other against relative rotation and the rotor stack is secured against rotation relative to other components on its common spool (e.g., the low and high speed/pressure spools of the engine). Various systems for tying rotor disks together may comprise keying arrangements, which may be associated with the maintenance of a longitudinal compressive force across the disk stack so as to maintain the engagement. Other arrangements may use extraneous components such as fasteners or bolts.

SUMMARY

In accordance with various embodiments, disclosed is a coupling method for joining rotating components comprising: stacking the rotating components to form a rotating stack aligned along a central axis, wherein the rotating components are supported on joints configured to friction lock with one another, wherein the rotating stack is formed by adjacently aligning the joints, and wherein each of the joints comprises tapered teeth which are configured to intermesh with the tapered teeth of an adjacent joint; and applying a compressive force to the rotating stack, the compressive force being sufficient to cause the joints to interlock with one another. In one embodiment, the tapered teeth are axially tapered at an angle approximately equal to or less than 20 degrees. In one embodiment, the method further comprises aligning the tapered teeth of adjacent joints in intermeshing orientation. In one embodiment, each of the joints comprises an annular structure supporting the tapered teeth, wherein the annular structures are adjacently aligned to form the rotating stack. In one embodiment, the method further comprises stacking the rotating components across at least one tie shaft, wherein the tie shaft runs down the central axis of the rotating stack. In one embodiment, the tie shaft comprises capping components in threaded engagement with the tie shaft, at opposite ends of the tie shaft, wherein applying a compressive force comprises threadably tightening the capping components. In one embodiment, the joints comprise curvic joints having rounded tooth edges, further comprising aligning the joints via the rounded tooth edges. In one embodiment, the rotating components are components of a jet engine, and the coupling method comprises joining rotating components of a jet engine. In one embodiment, the rotating components are rotors, and wherein the rotating components are aligned to form a rotating stack. In one embodiment, at least two of the joints are formed from different materials, wherein stacking the rotating components to form a rotating stack comprises adjacently aligning at least two joints formed from different materials.

In accordance with various embodiments, disclosed is a coupling method for joining rotating components of a jet engine comprising: stacking the rotating components to form a rotating stack aligned along a central axis, wherein the rotating components are supported on joints configured to friction lock with one another, wherein the rotating stack is formed by adjacently aligning the joints, wherein each of the joints comprises tapered teeth which are configured intermesh and interlock with the tapered teeth of an adjacent joint, and wherein at least two of the joints are formed from different materials; and applying a compressive force to the rotating stack, the compressive force being sufficient to cause the joints to interlock with one another. In one embodiment, the rotating components are rotors, and the rotating stack is a rotor stack of the jet engine. In one embodiment, the tapered teeth are axially tapered at an angle approximately equal to or less than 45 degrees.

In accordance with various embodiments, disclosed is a coupling system joining rotating components of an engine, comprising: a first joint comprising a first annular structure supporting a first set of teeth formed between welts adjacent the teeth, wherein a first rotating component is coupled to the first annular structure, a second joint comprising a second annular structure supporting a second set of teeth formed between wells adjacent the teeth, wherein a second rotating component is coupled to the second annular structure, wherein the first set of teeth and the second set of teeth are tapered, wherein the first set of teeth are configured to intermesh with the second set of teeth, upon adjacent axial alignment of the first joint and the second joint, such that the first set of teeth are configured to be received between the teeth and within the wells of the second set of teeth, and the second set of teeth are configured to be received between the teeth and within the wells of the first set of teeth, and wherein the first set of teeth are configured to friction lock with the second set of teeth upon application of compressive pressure sufficient to interlock the first joint and the second joint. In one embodiment, the first set of teeth and the second set of teeth are axially tapered at an angle approximately equal to or less than 20 degrees. In one embodiment, the first set of teeth and the second set of teeth have rounded edges and wherein the first joint and second joint are curvic joints. In one embodiment, the first set of teeth are configured to wedge between the second set of teeth upon application of compressive pressure sufficient to interlock the joints. In one embodiment, an axial span of the first set of teeth is shorter than an axial span of the wells of the first joint, and wherein an axial span of the second set of teeth is shorter than an axial span of the wells of the second joint. In one embodiment, the engine is a jet turbine engine. In one embodiment, the rotating components are rotors of a jet turbine engine.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

In accordance with various embodiments, disclosed is a coupling system 100 comprising joints 102, configured to friction lock under compressive mechanical load via teeth 104 which are tapered. In various embodiments, coupling system 100 may be used for joining rotating components, which may be rotating components of an engine, such as a gas turbine, or other engine type. Coupling system 100 provides the alignment orientation for the joined components, and may eliminate the use of extraneous fasteners, bolts, interference fits and/or keying arrangements. The coupling system 100 may further enable material optimization by allowing for use of different materials throughout different engine sections, depending on the operating parameters, which may reduce weight and cost.

Figure 1:
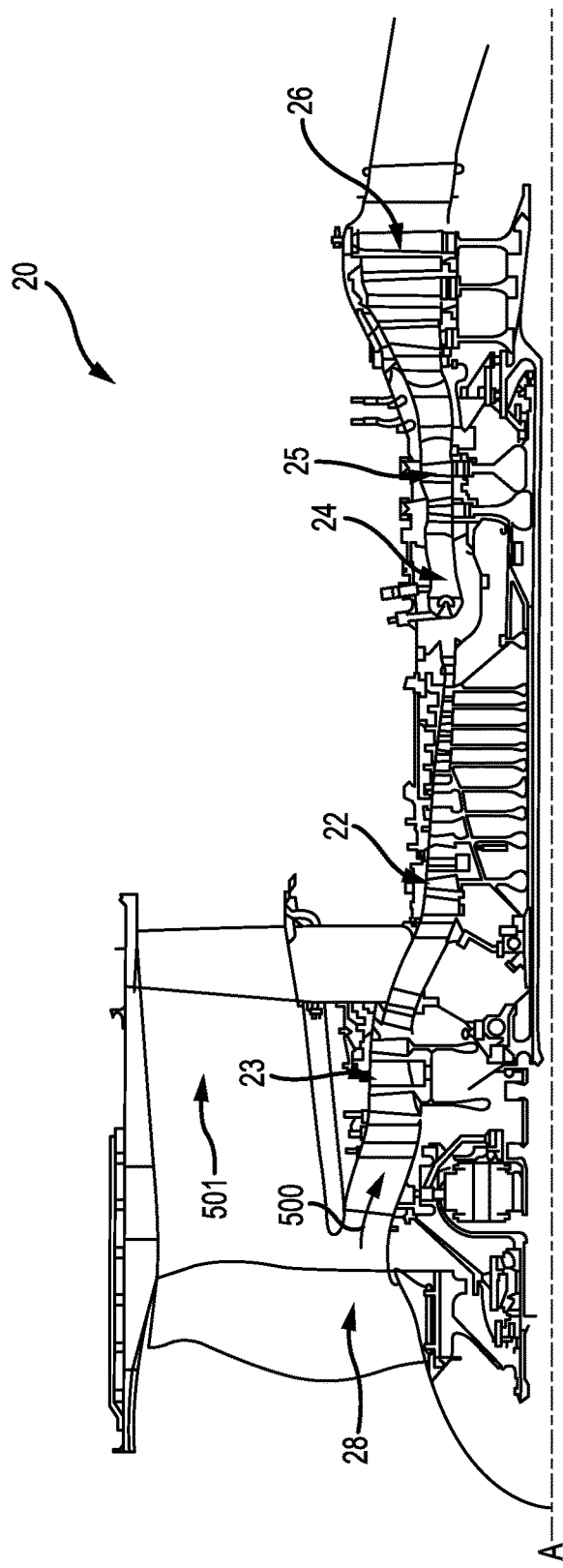
FIG. 1 is a partial longitudinal sectional view of a gas turbine engine.

In accordance with various embodiments, and with reference to FIG. 1, an exemplary gas turbine engine 20 may have a high speed/pressure compressor (RPC) section 22 receiving air moving along a core flowpath 500 from a low speed/pressure compressor (LPC) section 23 and delivering the air to a combustor section 24. High and low speed/pressure turbine (HPT, LPT) sections 25 and 26 may be downstream of the combustor along the core flowpath 500. In various embodiments, gas turbine engine 20 may further include a transmission-driven fan 28 driving air along a bypass flowpath 501 and/or an augmentor (not shown) among other systems or features. In various embodiments, gas turbine engine 20 may include various rotating components, which may be mounted for rotation on various shaft structures via coupling system 100, about an engine central longitudinal axis or central axis A relative to an engine stationary structure. Various rotating components, may include, for example various rotors, such as LPC and LPT rotors, various impellers, turbine wheels, and couplings, etc.

Figure 2A:
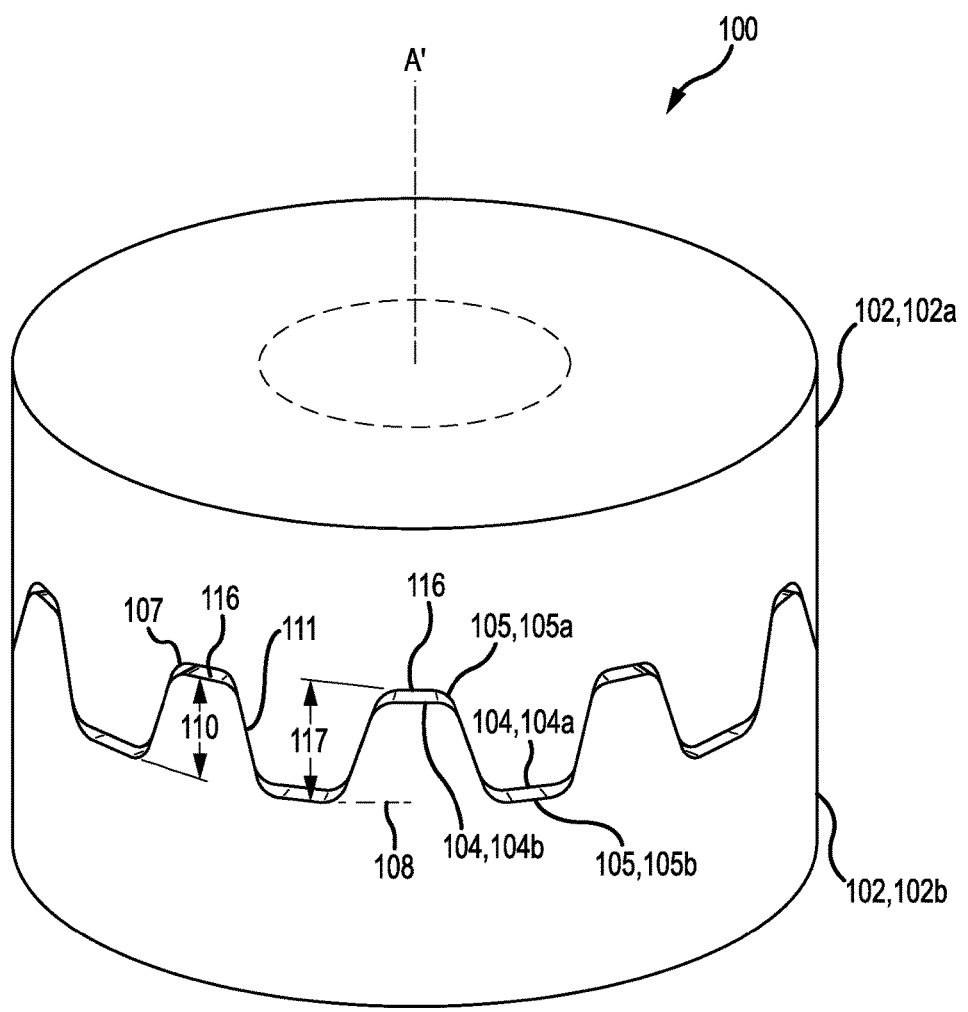
FIG. 2A illustrates a curvic joint, according to various embodiments.
Figure 2B:
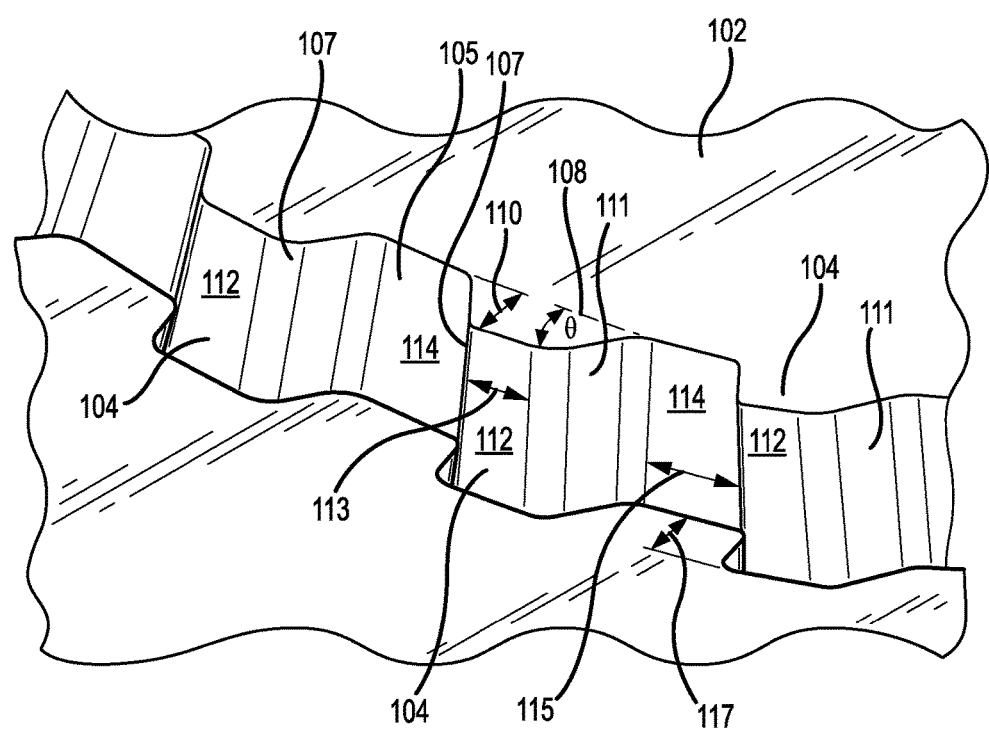
FIG. 2B is a magnified view of a portion of the curvic joint of FIG. 2A.

According to various embodiments, coupling system 100 comprising joints 102 is shown in FIGS. 2A, 2B. According to various embodiments, joints 102 may comprise curvic joints, which have curved teeth, as shown in the figures. According to various embodiments, joints 102 generally comprise annular structures supporting sets of teeth 104 formed between adjacent wells 105, configured to intermesh upon coupling, wherein the teeth of a first joint 102a of joints 102 fit between the teeth 104 and within the wells 105, of a second joint 102b.

In accordance with various embodiments, and with reference to FIG. 2A, joints 102 may be represented by a first half of a joint 102a ("first joint 102a), supporting a first set of teeth 104a formed between wells 105a, and a second half of a joint 102b (second joint 102b), supporting a second set of teeth 104b, formed between wells 105b, configured to intermesh with the first set of teeth 104a, wherein each tooth 104 is configured to be received within a corresponding well 105. According to various embodiments, teeth 104 are congruent to one another, having similar size and relative orientation with respect to a central axis A' of joint 102. According to various embodiments, teeth 104 have side walls 111 which are tapered ("axially tapered") with respect to a planar surface 108 orthogonal to central axis A'. According to various embodiments, side walls 111 are tapered at an angle θ of less than 45 degrees. According to various embodiments, angle θ may be approximately equal to or less than 20 degrees. According to various embodiments, the surface of side walls 111 may be flat (as shown in the figures), or bulging (i.e. concave and/or convex), wherein corresponding teeth may have oppositely oriented bulges, according to various embodiments. In various embodiments, the axial span 110 of teeth 104 may be at least about 0.0002 inches (0.0005 cm). In various embodiments, the axial span 110 of teeth 104 may be about 0.175 inches (0.44 cm) According to various embodiments, teeth 104 have edges 107 or fillets which are rounded, as shown in FIGS. 2A and B.

According to various embodiments, first set of teeth 104a, and second set of teeth 104b are configured to lock together by axially compressing joint 102a against joint 102b, to wedge teeth 104a within wells 105b, and to wedge teeth 104b within wells 105a, as shown in FIG. 2A. To this end, first set of teeth 104a are configured to be in substantial contact with second set of teeth 104b upon compression of joint 102a against joint 102b, wherein substantial contact may be defined as at least 80% contact between corresponding side walls 111 of at least 90% of the teeth 104. In various embodiments, teeth 104 comprise top portions 112, each having a radial span 113, and wells 105 comprise bottom portions 114 each having a radial span 115, wherein radial span 113 of the top portions 112 of the teeth 104 may be slightly greater than the radial span 115 of the bottom portions 114 of the wells 105 in order to facilitate wedging of the teeth within the wells (as this configuration allows the teeth 104 to be inserted axially further within the wells 105). Additionally, the axial span 110 of teeth 104, is slightly shorter than an axial span 117 of the wells 105, also to facilitate wedging, according to various embodiments. This is illustrated in FIG. 2A, wherein a space 116 is formed between corresponding teeth and wells. However, teeth 104 may be configured to pack without space 116.

Locking between intermeshed teeth 104 of first set of teeth 104a, and second set of teeth 104b upon high force compression is due to frictional forces between the tapered side walls 111, wherein high mechanical loads are required to separate the wedged teeth. In various embodiments, wherein joints 102 comprise steel, it was found that an axial compression force of about 100,000 pounds (~440,000N) was used to interlock joint 102a with joint 102b, and a force in the order of approximately 40,000 pounds (~180,000N) was required to pull the joints 102 apart. However, as will be apparent to one skilled in the art, the axial compression force required to interlock joints 102 may depend on various factors, such as frictional coefficients, geometry and size of the teeth, ambient temperature, etc., according to various embodiments.

Figure 3:
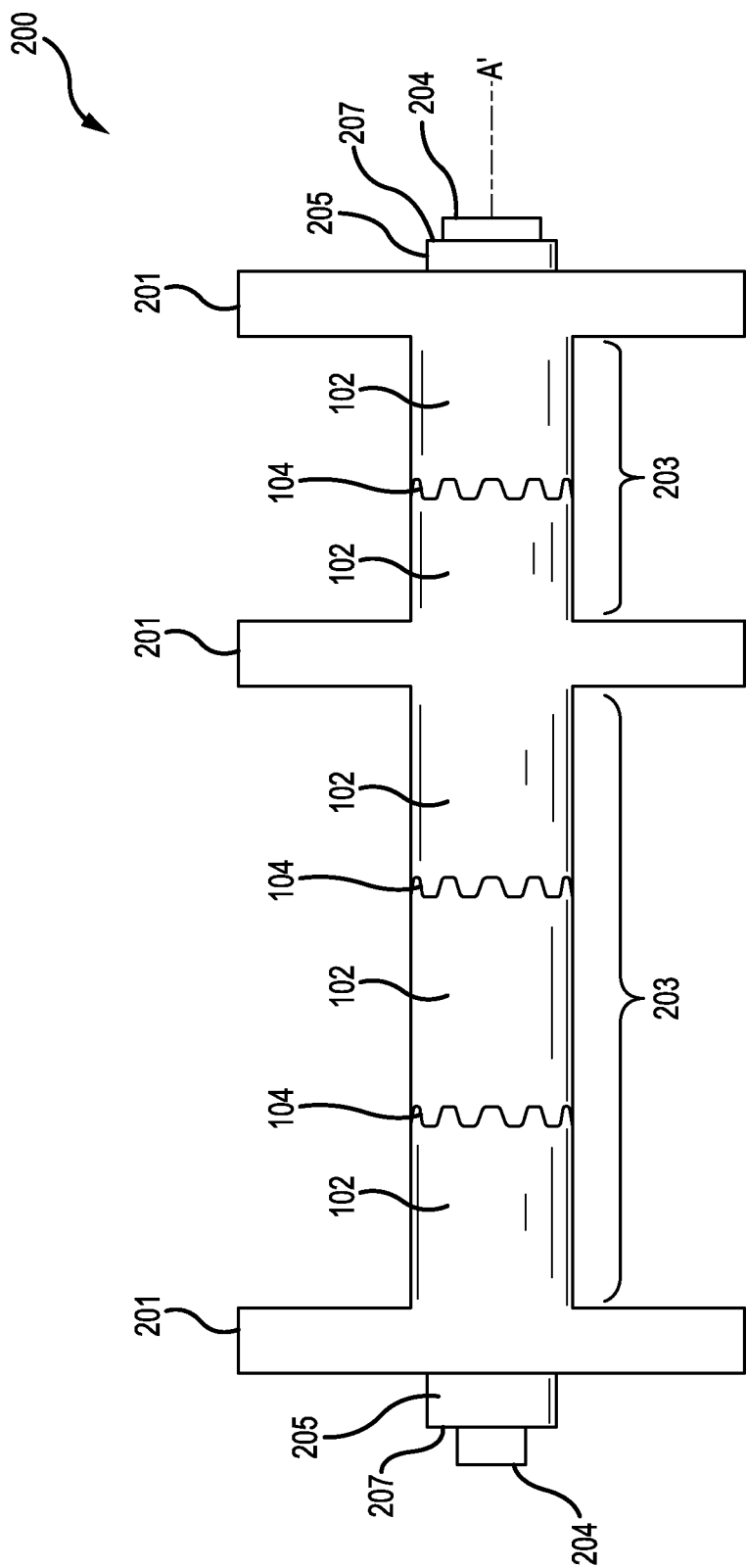
FIG. 3 illustrates a rotating stack comprising the curvic joint of FIG. 2A.
Figure 4:
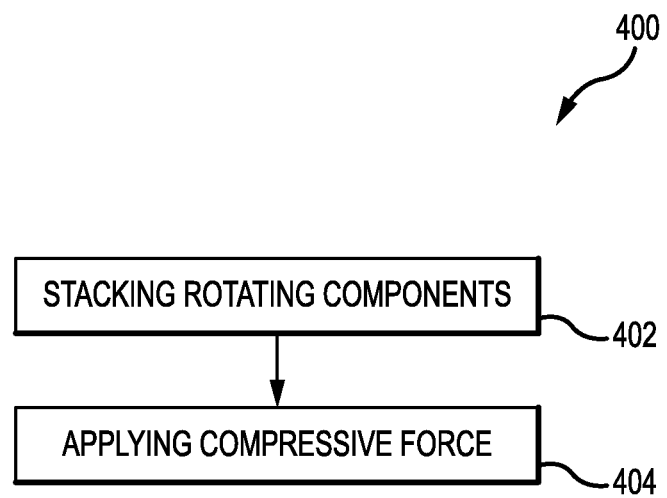
FIG. 4 illustrates a joint coupling method for components of an engine, according to various embodiments.

FIG. 3 shows a rotating stack 200, comprising a plurality of rotating elements 201, joined via joints 102 which form a shaft structure 203 about central axis A' for coupling the rotating elements 201. In various embodiments, rotating stack 200 may be a may be a rotor stack, wherein rotating elements 201 may comprise rotors, for example. According to various embodiments, a tie shaft 205 may axially extend within shaft structure 203 along central axis A' of rotating stack 200, wherein the shaft structure 203 may be capped by components 204 ("capping components"), such as tie-bolt(s), and/or tie-nut(s), and washers, which may be threaded, on ends 207 of the tie shaft 205, through which a compressive force sufficient to friction lock joints 102 may be applied (e.g. by tightening or screwing the components 204). Joints 102 are configured to provide alignment and transfer torque along shaft structure 203.

According to various embodiments, joints 102 forming shaft structure 203 may be of the same or similar material (e.g. austenitic nickel-chromium-based alloy such as Inconel™ which is available from Special Metals Corporation of New Hartford, N.Y., USA). According to various embodiments, joints 102 forming shaft structure 203 may be of dissimilar material. The use of dissimilar material throughout shaft structure 203 allows for material optimization throughout different sections of an engine, such as gas turbine engine 20, based on cost, weight, and required operating parameters at the different sections. For example, a shaft running through both high temperature and low temperature sections of an engine, may be formed from a high temperature material such as an austenitic nickel-chromium-based alloy such as Inconel™ in the high temperature section, and steel in the lower temperature section.

According to various embodiments, a coupling method 400 for joining rotating components comprises a step 402 of stacking the rotating components to form a rotating stack aligned along a central axis, wherein the rotating components are supported on joints configured to friction lock with one another, the rotating stack comprising a plurality of joints adjacently aligned, wherein the joints comprise tapered teeth which are configured intermesh and interlock with the teeth of an adjacent joint. In various embodiments, the coupling method 400 further comprises a step 404 of applying a compressive mechanical load at opposite ends of the rotating stack, the compressive mechanical load being sufficient to cause the joints to interlock with one another. In various embodiments, the compressive force may be at least about 100,000 pounds (~440,000N). In various embodiments, step 402 of stacking the rotating components further comprises aligning the interlocking teeth of adjacent joints in intermeshing orientation. In various embodiments, each joint comprises an annular structure supporting the tapered teeth. In various embodiments, step 402 of stacking the rotating components comprises stacking the rotating components across at least one tie shaft, wherein the at least one tie shaft runs down the central axis of the rotating stack. In various embodiments, the tie shaft comprises capping components in threaded engagement with the tie shaft, at opposite ends of the tie shaft, and the compressive force is applied by threadably tightening the capping components. In various embodiments, the joints comprise curvic joints having rounded tooth edges. In various embodiments, the rotating components are components of a jet engine. In various embodiments, the rotating components are rotors, and the rotating stack is a rotor stack. In various embodiments, at least two of the joints are formed from different materials.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A coupling method for joining rotating components comprising:

stacking the rotating components to form a rotating stack aligned along a central axis, wherein the rotating components are supported on joints wherein the rotating stack is formed by adjacently aligning the joints, and wherein each of the joints comprises tapered teeth which are configured to intermesh with the tapered teeth of an adjacent joint, wherein each tooth of the tapered teeth comprises tapered side walls; and applying a compressive force to the rotating stack to cause the joints to friction interlock with one another due to the frictional forces between the tapered side walls;

wherein:

the joints comprise a first joint having a first annular structure and a second joint having a second annular structure;

the tapered teeth comprise a first set of teeth extending from the first annular structure and a second set of teeth extending from the second annular structure;

first wells are defined between adjacent first teeth of the first set of teeth;

second wells are formed between adjacent second teeth of the second set of teeth;

the stacking the rotating components to form the rotating stack comprises aligning the first joint with the second joint such that first set of teeth are received between the adjacent second teeth and within the second wells and the second set of teeth are received between the adjacent first teeth and within the first wells;

the applying the compressive force comprises applying a compressive mechanical load at opposite ends of the rotating stack to cause frictional forces between the tapered side walls of the first set of teeth and the second set of teeth to friction interlock with one another;

a circumferential span of top portions of the first set of teeth and the second set of teeth is greater than a circumferential span of bottom portions of the first well and the second wells in which the first set of teeth and the second set of teeth are received within.

2. The coupling method of claim 1, wherein the tapered teeth are axially tapered at an angle approximately equal to or less than 20 degrees.

3. The coupling method of claim 1, further comprising aligning the tapered teeth of adjacent joints in intermeshing orientation.

4. The coupling method of claim 1, wherein each of the joints comprises an annular structure supporting the tapered teeth, wherein the annular structures are adjacently aligned to form the rotating stack.

5. The coupling method of claim 1, further comprising stacking the rotating components across at least one tie shaft, wherein the tie shaft runs down the central axis of the rotating stack.

6. The coupling method of claim 5, wherein the tie shaft comprises capping components in threaded engagement with the tie shaft, at opposite ends of the tie shaft, wherein applying a compressive force comprises threadably tightening the capping components.

7. The coupling method of claim 1, wherein the joints comprise curvic joints having rounded tooth edges, further comprising aligning the joints via the rounded tooth edges.

8. The coupling method of claim 1, wherein the rotating components are components of a jet engine, and the coupling method comprises joining rotating components of a jet engine.

9. The coupling method of claim 1, wherein the rotating components are rotors, and wherein the rotating components are aligned to form a rotating stack.

10. The coupling method of claim 1, wherein at least two of the joints are formed from different materials, wherein stacking the rotating components to form a rotating stack comprises adjacently aligning at least two joints formed from different materials.

* * * * *